United States Patent

Weingarden et al.

[11] Patent Number: 6,164,975
[45] Date of Patent: Dec. 26, 2000

[54] INTERACTIVE INSTRUCTIONAL SYSTEM USING ADAPTIVE COGNITIVE PROFILING

[75] Inventors: Marshall Weingarden, 13134 Sherwood, Huntington Woods, Mich. 48070; Edward Ronald Griffor, Grosse Pointe Park, Mich.

[73] Assignee: Marshall Weingarden, Huntington Woods, Mich.

[21] Appl. No.: 09/210,483

[22] Filed: Dec. 11, 1998

[51] Int. Cl.[7] .............................. G09B 3/00; G09B 7/00; G09B 19/00; G09B 5/00

[52] U.S. Cl. .................. 434/322; 434/118; 434/236; 434/307 R; 434/323; 434/353; 434/362

[58] Field of Search .................... 434/118, 236, 434/307 R, 322, 323, 353, 354, 362

[56] References Cited

U.S. PATENT DOCUMENTS

| | | |
|---|---|---|
| 4,820,167 | 4/1989 | Nobles et al. . |
| 5,002,491 | 3/1991 | Abrahamson et al. . |
| 5,011,414 | 4/1991 | Yoshizawa et al. . |
| 5,176,520 | 1/1993 | Hamilton . |
| 5,241,671 | 8/1993 | Reed et al. ............................. 395/600 |
| 5,261,823 | 11/1993 | Kurokawa . |
| 5,267,865 | 12/1993 | Lee et al. . |
| 5,316,485 | 5/1994 | Hirose .................................. 434/322 |
| 5,441,415 | 8/1995 | Lee et al. . |
| 5,810,605 | 9/1998 | Siefert ................................... 434/362 |
| 5,813,863 | 9/1998 | Sloane et al. ........................... 434/236 |

*Primary Examiner*—Valencia Martin-Wallace
*Assistant Examiner*—John Edmund Rovnak
*Attorney, Agent, or Firm*—Reising, Ethington, Barnes, Kisselle, Learman & McCulloch, P.C.

[57] ABSTRACT

An interactive instructional system realizing an eventstream based educational methodology and enabling an interactive, adaptive learning environment. Continuously tracking and evaluating learner interaction, the system creates and updates a profile of the learner's cognitive style and achievement level. Using this cognitive profile, the system adapts its presentations to the learner's cognitive style and demonstrated ability. Presentations take the form of eventstreams, which are branching sequences of multimedia objects called events. Some of the events contain substantially similar content presented in differing ways so that, using the learner's cognitive profile, the system can select the event that results in the greatest comprehension of the presented material. This selection is accomplished using a utility function that is based on the cognitive profile and that provides a measure of the teaching utility of each of the different cognitive styles. The system can adapt to the learner by updating the utility function through the use of preference relations which are determined through testing and that indicate that of the cognitive styles results in the greatest comprehension by the learner of the content contained within the presentations. The system includes an eventstream development environment which allows the content developer to use accessible libraries of events to create new eventstreams. The eventstreams are structured to follow the paradigm of observed history so that each topic can be presented in the historical context in which it developed.

20 Claims, 4 Drawing Sheets

INTERACTIVE INSTRUCTIONAL SYSTEM USING ADAPTIVE COGNITIVE PROFILING

TECHNICAL FIELD

This invention relates generally to computer-based instructional systems and, in particular, to instructional systems that have the ability to adapt to the learner.

BACKGROUND OF THE INVENTION

Traditional educational technology has as its basic object subjects or topics. It uses a lecture-based model to transfer content to the learner. During the lecture, the material is presented verbally, often with the help of visual, audio, textual and other such aids. In most instances, the learner's involvement in the lecture is minimal and mostly passive. The concepts or ideas that appear in a lecture-based presentation of a subject are usually presented in an order corresponding to the logical dependencies between them. Other than the subject of history itself, the historical context and historical development of a particular subject or topic is seldom more than a footnote.

SUMMARY OF THE INVENTION

To overcome the disadvantages of the lecture-based model utilized by most educational technology, the present invention provides both a new approach to learning methodology as well as new tools for their implementation. The new tools are embodied in adaptive computer programming technology. This programming technology can be executed or run on most existing computing devices. The invention provides a complete electronic learning environment which adapts continuously to the cognitive style and learning capabilities of the learner, meaning that the system adapts to the way that learner processes new information.

In accordance with one aspect of the invention, there is provided a method of constructing an interactive educational presentation for use by a learner on a computer workstation. The method includes the steps of:

(a) providing a plurality of related event objects, each of which includes different content that is topically related to the content of the other of the event objects, and each of which has at least an audio, textual, or visual component that can be presented via the computer workstation;

(b) providing a number of additional event objects, each of which includes content that is substantially the same as the content of a corresponding one of the related event objects, and each of which provides a presentation of content that is different than the presentation provided by the corresponding related event object; and (c) creating an eventstream having the structure of a branching sequence of nodes, each of the nodes representing one of the related event objects and any of the additional event objects corresponding to that related event object.

Each event object, or simply "event," can be a multimedia file with the eventstream comprising a tree-like structure of event objects that defines the interactive educational presentation. The eventstream can be created as a script that identifies the event objects within the eventstream and that defines the branching sequence of event objects. The different presentations provided by the event objects having substantially similar content is accomplished by placing differing emphases on the audio, textual, and visual components used in the presentations.

The different event objects having substantially similar content are designed to accommodate different learner's differing cognitive styles. For this purpose, each cognitive style and learner has a cognitive index associated therewith. Then, the learner's cognitive index can be used to determine which of two or more event objects covering substantially similar content will be presented to the user as a part of the eventstream. Preferably, the selection between two or more event objects is accomplished using a utility function that is unique to the learner and that provides a measure of the teaching utility of each of the different cognitive styles. The system can adapt to the learner by updating the utility function through the use of preference relations which are determined through testing and which indicate which of the cognitive styles results in the greatest comprehension by the learner of the content contained within the presentations.

In the broader aspects of the invention, there is provided a method of presenting information on a computer workstation. The method includes the steps of:

(a) providing a plurality of computer-displayable presentations, some of which provide different topically-related content and others of which utilize different cognitive styles to present substantially similar content, wherein the different cognitive styles each has a cognitive index associated therewith;

(b) providing a cognitive profile for a learner;

(c) selecting at least one of the other presentations using the cognitive profile associated with the learner; and (d) providing the learner with an ordered sequence of the presentations that includes the selected presentations.

This method can be used to provide presentations over a global computer network, such as the Internet, in which case the computer-displayable presentations can comprise web pages that are provided over the global computer network for display on the computer workstation. A cookie or other such information can be stored on the user's computer workstation to identify the cognitive profile associated with the user. Then, in use this cookie could be accessed by the server and used to select the web pages provided to the user.

BRIEF DESCRIPTION OF THE DRAWINGS

A preferred exemplary embodiment of the present invention will hereinafter be described in conjunction with the appended drawings, wherein like designations denote like elements, and.

DETAILED DESCRIPTION OF THE PREFERRED EMBODIMENT

Overview

Figure 1:
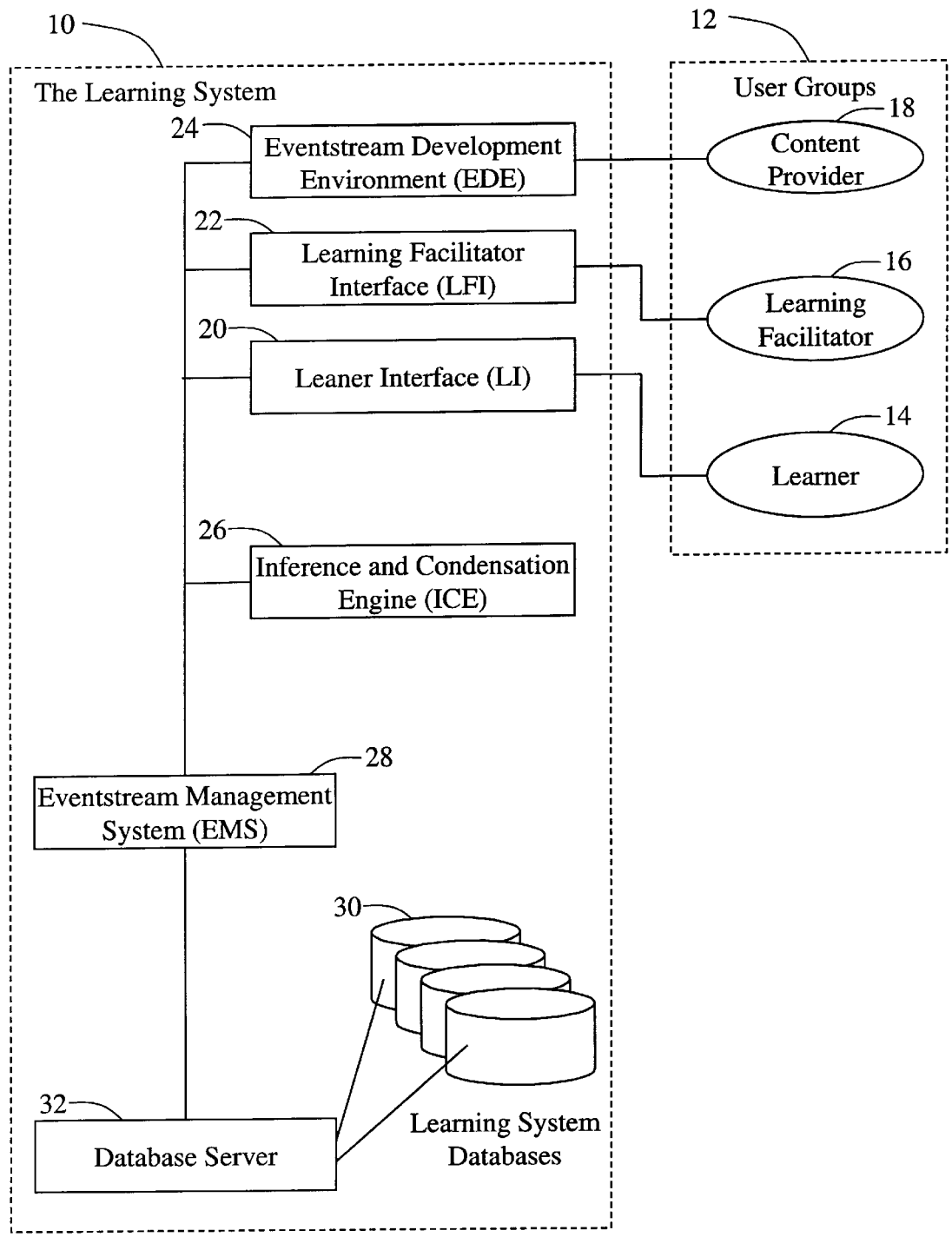
FIG. 1 is a block diagram of the structure of a preferred embodiment of the instructional system of the present invention.

The present invention is computer-based technology that can be used for instruction or presentation of material, either on a stand-alone computer or over a public or private network. The preferred embodiment is referred to herein as the Learning System and is used to provide an interactive adaptive learning environment where its learning software applications can be developed and run. It is multiple platform technology and designed to run on major, existing machine operating systems. A graphic environment interface enables the learner to navigate through the Learning System's presentations and learner tests. The presentations, referred to more generically as events or event objects, each comprise a multimedia file (such as an avi clip) that can be run on the computer. Topically-related events are organized together into an eventstream, which can have the structure of tree such that the eventstream comprises a branching sequence of events. Thus, the milestones of topic development form an eventstream. An evenstream's appearance corresponds to the way this invention organizes the events that make up a topic. The system provides the tools necessary for developing eventstreams from its own event library or an external library.

The Learning System emphasizes in its approach to instruction the concept that knowledge is interrelated. By focusing on knowledge as a fabric of interrelated ideas, the Learning System encourages abstract thinking. In addition to being a system of ideas with mechanisms for extending it like deductive reasoning and reasoning by analogy, the body of knowledge on a particular topic has a life of its own. The story of that life can be more informative than the simple highlights of it (i.e., more informative than the historical events or developments themselves), since the manner in which the events developed are part and parcel of that same story.

More specifically, the educational methodology on which Learning System is based structures material following the paradigm of observed history. It allows the developer to order events in variety of different ways. Each new idea or concept that has arisen has done so in a context that motivated it or even necessitated its formulation. The additional information that a context provides makes the events surrounding them seem more natural. Part of the reason for this has to do with the conceptual culture of ideas. Presenting knowledge in an order that more closely resembles the fabric of knowledge awakens some of the original insight. Events, in the sense of occurrences or facts, no longer stand alone or only as a part of a single subject. The events of the Learning System are instead easily incorporated into any of the Learning System's eventstreams. The system's ways of manipulating eventstreams reflect the way in which individual ideas and concepts fit into that body of knowledge.

The Learning System is an interactive system that adapts to the cognitive style of the learner, repeatedly challenging the learner's comprehension and facility with the material presented and adjusting the level of the material to the level of ability demonstrated by the leaner. This is accomplished by constantly adjusting the interactions with a given learner based on its previous interactions with that user. These interactions can include, e.g., testing, choices of formatting for the events in eventstreams, onscreen tools available to the learner and many others.

The system is open to content provided by third parties. It presents a development environment into which material is introduced in a manner that can be utilized by the system. Learning, plans (i.e., eventstreams) are developed from the material supplied by the content provider. Plans can be changed as needed. The system provides the learner with the material selected and may provide additional materials depending upon the freedom to learn that is granted the learner.

Referring now to FIG. 1, the Learning System, designated generally as 10, has three distinct interfaces to the different groups 12 of users of the system: one to learners 14 themselves, another to learning facilitators 16, and a third to content providers 18. The learner interface (LI) 20 presents multimedia objects to the learners 14. The learning facilitator interface (LFI) 22 enables, among other things, the learning facilitator 16 to create lesson plans (eventstreams) and toggle between eventstream settings that are fixed by the content provider 18. The third interface is for content providers 18 and is an eventstream development environment (EDE) 24. This latter interface enables content providers 18 to load correctly formatted multimedia objects into the Learning System 10 in order to develop new eventstreams. It also enables the content provider 18 to connect events in accordance with the structural requirements of an eventstream. The learning facilitator interface 22 allows the development of learning plans. Features include the ability to establish the core of knowledge to be covered as a base, enhancements to a core of events and concepts to be presented to all learners, and advanced presentations available to selected learners based upon demonstrated ability or other criteria. There are also system defaults that the facilitator can accept in lieu of custom settings.

The Learning System 10 includes an inference and condensation engine (ICE) 26 that absorbs learner data. The inference and condensation engine 26 develops strategies for the learner 14 from an initial set of learner responses and appropriate strategies. It also tracks learner cognitive preferences and progress using a knowledge base of continuously updated learner profiles. Thus, the inference and condensation engine 26 is what enables the adjustment of system presentations to the cognitive style and ability level of the learner.

Learning System 10 also includes an event management system (EMS) 28. Its structure and operations embody some of the ways in which people commonly organize concepts and ideas into clusters with links or references between them. Event management system 28 manages not only the event objects themselves, but also the applications or programs that actually created the multimedia objects. If there are several different application programs then event management system 28 operates to open the various events using the appropriate programs when required by the eventstream. The event objects are multimedia files stored in one or more learning system databases 30, which can either be local storage or remote storage accessible over a network, in which case a database server 32 can be used to access the event objects.

As will be understood by those skilled in the art, Learning System 10 can be implemented as an application and can be designed for different operating systems, including, but not limited to, Microsoft Windows95TM or Windows98TM and successors, WindowsNTTM Workstation, UNIX and its variants, and LINUX.

Events and Eventstreams

Figure 2:
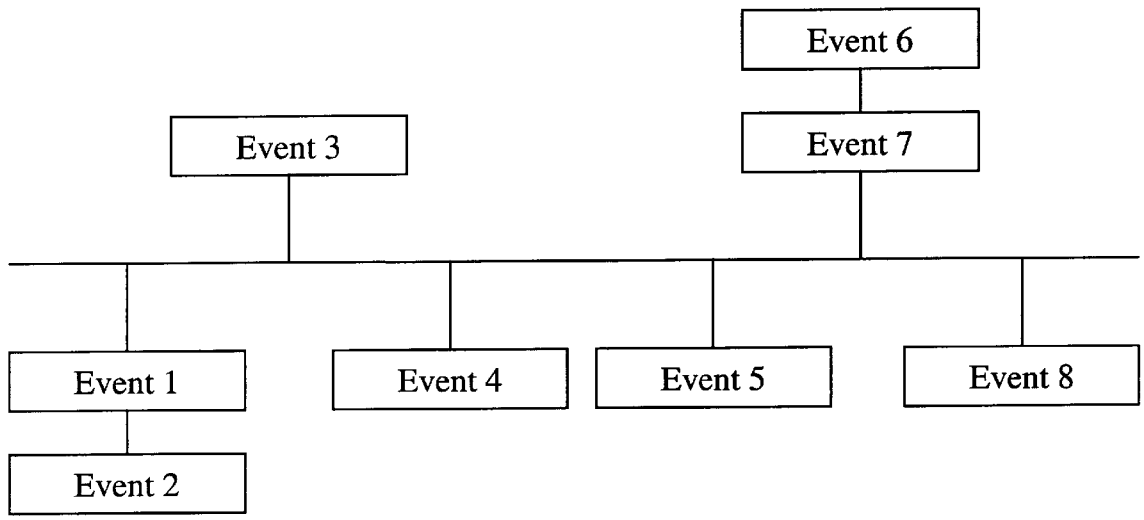
FIG. 2 is a diagram depicting an exemplary sequence of events that can be used in constricting an eventstream for use by the system of FIG. 1.
Figure 4:
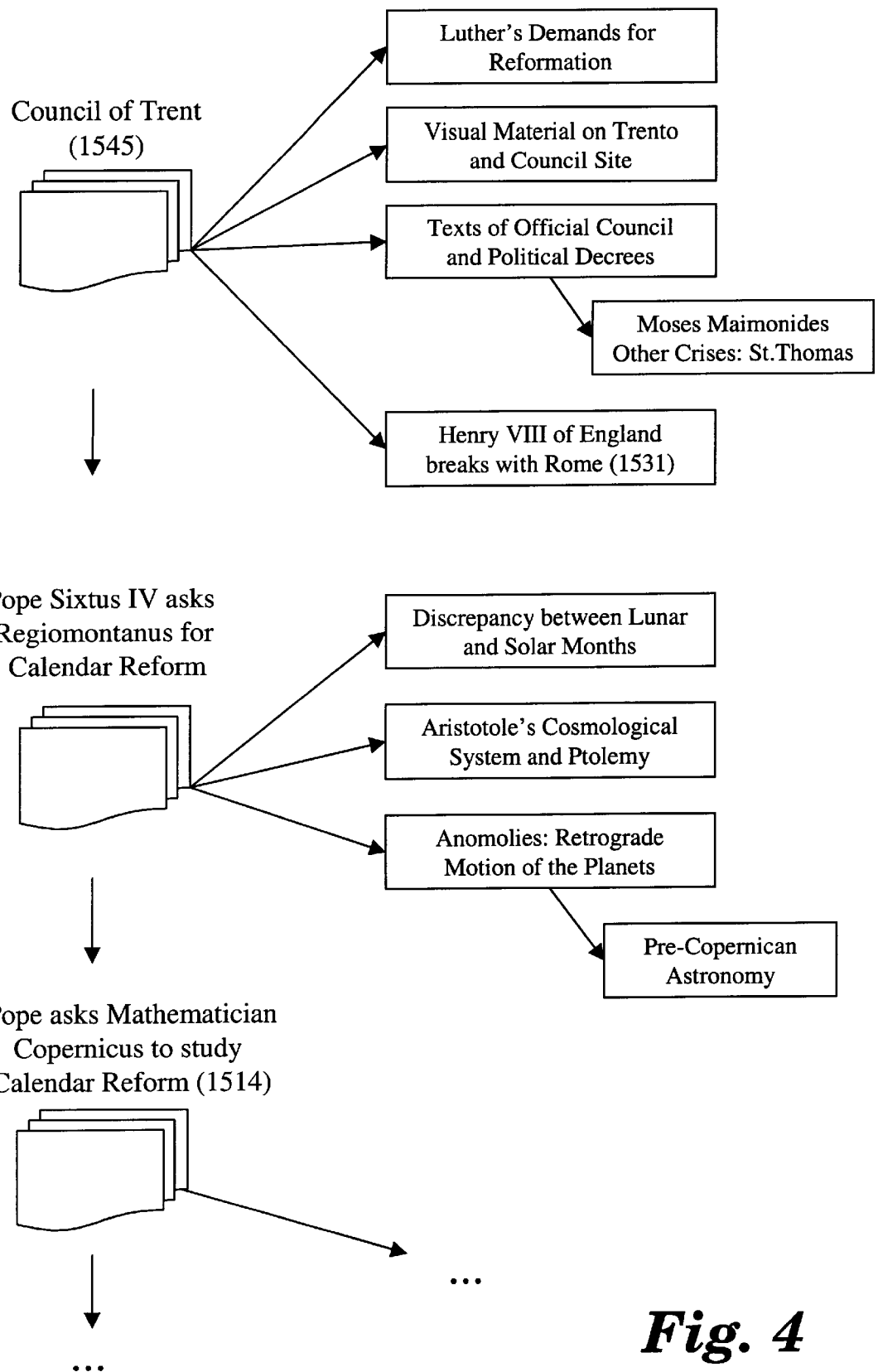
FIG. 4 is an example of a portion of an eventstream showing how content can be presented within its historical context.

An eventstream is a sequencing structure that, in its most typical use, follows the standard notion of time and the timeline representation of a sequence of events. FIG. 2 provides a simple example of such a sequence of events. An eventstream is a program or script written in the scripting language of the eventstream development environment (an EDE script) that controls the sequencing of the multimedia event objects. The eventstream development environment provides an object oriented graphic interface to its scripting language and enables a content provider to create eventstreams using events available locally on the content provider's own memory devices or events available on an available network. The events and links of an eventstream can be indexed in much the same way a database may be. This indexing aids the content provider in constructing new eventstreams. Thus, the Learning System's eventstream development environment provides the tools necessary for manipulating multimedia objects to constrict an eventstream. To clarify the basic functioning of the eventstream development environment, a simplified example of Learning System content will be discussed further below in connection with FIG. 4.

The linking of events in an eventstream is realized by an EDE script and not by the usual publicity devices like buttons or highlighted text. The EDE script describing an eventstream can be thought of as a lesson plan with several different possibilities at each point. The branching in an eventstream arises for two reasons. As will be described below, there will generally be several different versions of each event, corresponding to differing cognitive profiles. Another reason for branching in an eventstream is to enable the choice of settings available to the learning facilitator. The learning facilitator may choose to mask, i.e., make invisible or inaccessible, certain of the events generally available to the learner in an eventstream. Ultimately, the cognitive profile of the learner maintained by the inference and condensation engine 26 may be used to give each learner automatically a 'learning clearance level' which expands or contracts the extent and depth of the events available to that learner.

As a mathematical stricture an eventstream is a directed graph with no cycles and no isolated nodes. One node in a given collection of nodes X is accessible from another node in X if there is a sequence of directed edges of length k>0 leading through nodes in X starting in the first of these nodes and ending in the second. A node m in a tree T is a root of T, if every node in T is accessible from m. It can therefore be shown that all trees have at least one root. As used in the Learning System, the eventstreams are designed with only a single root. A set of nodes in a tree is called a branch of the tree if that set is a maximal linearly ordered subcollection of the nodes in the tree. Maximality indicates that no other nodes from the tree may be added to the branch without destroying its linearity. A set is linearly ordered if for any two nodes either one precedes the other in that ordering or follows it. The effect is that a branch is a path leading from the root of the tree all the way to some leaf. In fact, a branch in an eventstream corresponds to the path taken by some learner who starts and completes the lesson represented by the eventstream.

An eventstream should be regarded as a procedure, which, if executed, returns a collection of objects. For example, it can be described completely by specifying an aspect or property of event objects. Aspects are embodied as summaries associated with any object name. If the object collection returned were not to have all the properties of a tree, e.g. have isolated nodes or more than one root, then the Learning System will return an error message. If this occurs while a developer is composing an eventstream in the Learning System eventstream development environment EDE, this can be remedied by adding the necessary links or, if necessary, editing objects, e.g. by adding buttons.

Executing or running an eventstream is one of the central functions of the Learning System. Since an eventstream is a program in the scripting environment EDE, to execute it is to simply run that script. Each of the objects in an eventstream is an event object and executing a multimedia event object is to simply open it using the application that created it.

Branching in an eventstream, or the links to other objects, refers to the structure of the script that is run when executing the eventstream. At some points in that execution the script may prompt for a learner input and, depending on what that input is, the execution may continue in different ways, to different objects. The mechanisms used to facilitate these choices are publicity devices typical of which are buttons or highlighted text strings. Execution of the eventstream proceeds when the learner chooses one of these. The corresponding object is then displayed or run until the point at which the next learner input or choice is required by the eventstream.

Other operations on eventstreams are available to a content provider. For example, it is often useful or even necessary to back up along the path taken so far. A content provider may even be browsing and may have jumped ahead and need to back up to a previous position. The following are some natural operations to have available to the content provider while developing an eventstream:

1. Pass to the predecessor (it is unique by the definition of a tree).
2. Select a predetermined branch with deterministic execution to execute.
3. Pass to a substream using a more restrictive aspect.
4. Display other links associated with this eventstream's nodes (not a part of the given eventstream).
5. Pass to alphabetical listing of object names in the eventstream either using a mouse, input of a key combination or other device, e.g. voice prompt or touch screen.

The Basic Learning Cycle

Figure 3:
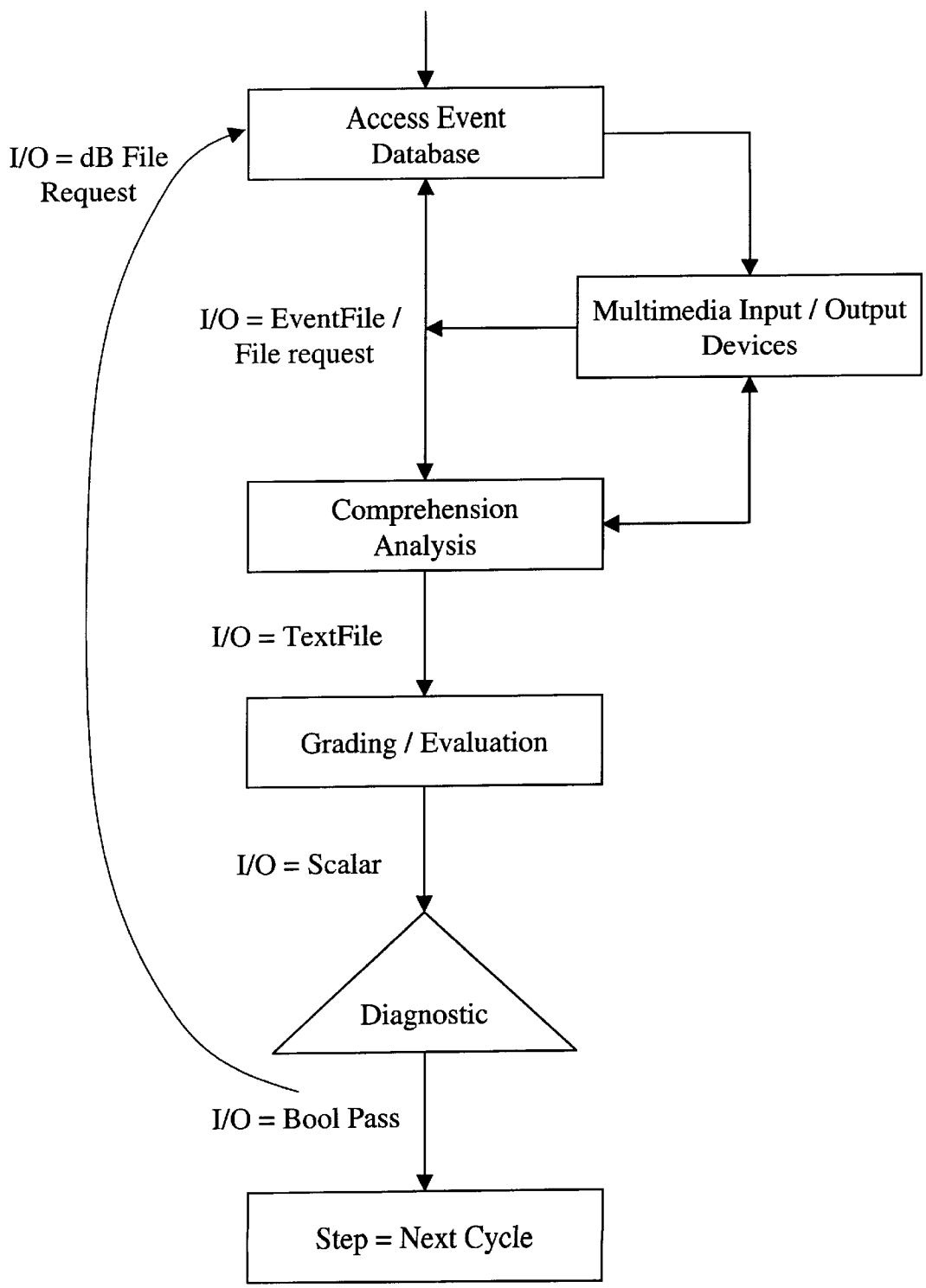
FIG. 3 is a flow chart showing the basic learning cycle used by the system of FIG. 1.

Referring now to FIG. 3, the basic learning cycle is the basic sequence of learner and Learning System acts composing a learning-evaluation cycle. This cycle consists of the Learning System's presenting material, the learner providing input to the Learning System (for example, in response to testing), a comprehension/cognitive evaluation of learner input and an updating of the learner's cognitive profile. The Learning System will, using the current profile of the learner, choose the appropriate version of the next presentation in the eventstream being run by the learner.

The basic learning cycle is a continuous feedback cycle. Each time control passes through this cycle it writes to the learner record, logging learner input as well as recording its evaluation of learner performance. For example, the learner record will be read when the system is determining the level of presentations to follow. It writes to the learner record all results of evaluation. Other sorts of learner input to the Learning System can also be written to the learner record, like choices made using mouse clicks or menu item selection. These may be selectively or completely logged in the learner record.

The presentation of learning material is coupled with a feedback mechanism for determining learner comprehension and ability to apply concepts and facts. Learner interactions may include discrete responses such as true or false and multiple choice, however, the preferred interaction is the application of presented knowledge to problem solving, including the reinterpretation of historical reality based upon the use of changed hypotheses. The "What if?" scenarios are enabled through Bayesian like networks. Learners are also challenged to take the next step in the evolution of knowledge by drawing on the historical background learned. Having been presented the set of events and circumstances that produced an outcome, they are asked to attempt to forecast the outcome before having learned what it is. Learner responses are assessed for content and concept. The assessment of the response is keyed to material previously covered so that it can be presented to the learner in a focused manner. Learner prompting may also be provided in response to incomplete or incorrect answers using a "hint" facility.

Automated Acquisition of Learner Preferences and Profile Generation

The inference and condensation engine (ICE) 26 is the component of the Learning System whose task it is to use the various learner records to build the learner cognitive profile. It is the "evaluative" component of the system. It reasons about a learner record to produce a cognitive profile of the learner. This is the process by which the Learning System produces a useable summary of the learner's ability, achievement level and cognitive style. The precise information tracked, the functioning of the inference engine, and the methods used to arrive at an adaptive learning strategy are discussed below.

Before discussing engine 26 in detail, it should be noted that engine 26 can be utilized in applications other than instructional systems. Given a set of user interaction features, engine 26 can be used to create and update a profile based on those features. It provides this feature-profile mechanism for stand-alone and networked users. An additional example of a profile is a consumer preference profile as applied to an individual or group. Such a consumer preference profile can be developed by aggregating the cognitive profiles or other information concerning a large number of users and determining averages or norms based upon the aggregate information. This would allow development of a global database of learner profiles and behaviors. The information gathered from learners can be analyzed and assembled into related clusters of learner responses and successful strategies for improving those responses. Refined strategies appropriate to the specific user can be uploaded to the Learning System from the network and stored with the user profile. When used over a global computer network, such as the Internet, the presentations (i.e., the event objects) can comprise web pages that are downloaded to the user's computer when a request for the content is received from the user. Several versions of the web page can be stored on the server and the cognitive profile of the user then being used by the server to decide which of the versions to send to the user. Cognitive profile information for each user can be stored locally as, for example, a cookie placed on the user's computer. The server then accesses this cookie using it to determine the version of the web page that best matches the cognitive style of the user.

The primary function of engine 26 is to optimize achievement level, as reflected in learner inputs, by matching the form and content of a presentation in the basic learning cycle with the cognitive preferences of the learner (as embodied in the cognitive profile of the learner). The typical responses of an ordinary learning assistant to inadequate learner performance would be to review the presentation and test once again for adequate comprehension. Engine 26 may instead vary the content and approach of the presentation itself to help maximize the comprehension of a given learner. For example, a learner's record may suggest that the he/she favors material presented visually. Consequently, the Learning System would choose the version of the next event in the eventstream being run whose own cognitive style summary indicates a strong visual factor.

The following sections detail how engine 26 can be implemented in software to evaluate and update a learner's cognitive profile and how the Learning System uses the cognitive profile to select events for presentation to the learner during execution of an eventstream.

Cognitive Profiles and Cognitive Indices

Each learner and each event object has a cognitive style, and the cognitive profiles and cognitive indices are used to provide a quantitative measure of these cognitive styles. In particular, the cognitive profiles are used to indicate a learner's cognitive style and these profiles are updated by engine 26 based on periodic testing of the learner. The cognitive indices are used to indicate an event's cognitive style and are used in conjunction with a learner's cognitive profile to adapt the presentation of material to the learner's cognitive style. In the Learning System, this is accomplished by providing eventstreams that have not only events objects that cover different content, but also event objects that have substantially similar content that is presented with differing emphases on the audio, textual, and visual content. Then, the learner's cognitive profile is used along with the cognitive indices of these different versions of the same content to determine which version will result in the greatest comprehension by the learner.

As will be discussed below, a learner's cognitive profile is used to provide a cognitive utility function that, using an event's cognitive index, provides a quantitative result indicating the degree to which the event matches the cognitive style of the learner. Thus, to determine which of several versions of an event should be presented, the system need only determine which one results in the greatest value of the cognitive utility function. The cognitive profile (upon which the learner's cognitive utility function is based) can be updated by an error correction routine that compares the utility function with an approximation of the utility function that is determined through testing using preference relations.

Preference Relations and Form of Cognitive Indices

Formally, learner preferences are recorded as instances of the preference relation. The Learning System will identify events with structurally similar content and test after presenting these to the learner in versions representing different cognitive styles. Based on the results it will conclude that one cognitive style is preferred to the other. This data will form an instance of the cognitive preference relation of the learner. This preference relation is then used to construct a cognitive profile of the learner.

Seen formally, a preference relation is a binary relation on a set of objects. In the case of inference and condensation engine 26, those objects will be called cognitive indices. Cognitive indices are denoted using the letters s and t, while the instances of the preference relation for learner L can be abbreviated by PL(s,t). Here the letter P is used to suggest the word preference and the letter L will typically be a name or abbreviation of the name of a learner. PL(s,t) is read: the cognitive index s is preferred to the cognitive index t by learner L. In general, a cognitive index is a sequence of cognitive settings or values of the cognitive profile parameters:

$(x1, \ldots, xn; y1, \ldots, ym)$.

For practical purposes the settings may be partitioned into two groups the first (the x's) being values for scaled settings while the others (the y's) are values for toggle settings. Examples of scaled settings are weights for amounts of video, audio and text in a presentation as well as the usual scaled settings like audio volume and so on. An example of a toggle setting is the language of a presentation. Toggled settings have the additional property that they are mutually exclusive, meaning that only one of the alternatives available can be chosen as the setting at any given time. Fixed values for all of these settings define a particular cognitive style. This style may characterize a package or segment of one of the Learning System's events or it may characterize a learner's own cognitive preferences. The term cognitive style will be used in both of these senses.

Preference data (or instances of a learner's preferences) may be generated in several ways. When a learner registers as a user on the Learning System, they are beginners (the level component of their cognitive profile is equal to 0). The remaining components of their cognitive profile may be set to the generic or average values or initial cognitive testing may be used to determine them. This entails giving an equal value or cognitive utility to all modes of presentation available to the Learning System. This is the way each learner's record is initialized.

As remarked above, cognitive testing tools may also be used to fix the initial values of a learner's cognitive profile. A second way in which preference data is accumulated about the cognitive profile of a learner is in the course of their interaction with the Learning System.

It would be useful to check whether a given learner prefers cognitively a Learning System presentation (event, eventstream or fragment thereof) created according to one cognitive index rather than another. Running the same material in two formats and then testing for the same learner has obvious difficulties. Having run and been tested on the first format will effect the testing result for the format run second. Two solutions to this problem are to collect cognitive preference data through parallel and sequential testing.

Parallel testing involves presenting material in parallel, at the same time, to the learner whose cognitive formats are distinct. By comparing the distinct testing results that arise, it can be concluded that the higher the test result, the greater the cognitive value of the corresponding formatting.

The second method of collecting cognitive preference data is sequential testing. It involves testing on materials that have structurally similar content while having distinct cognitive profiles. The structural similarity allows the test results to be compared and used as an instance of the learner's cognitive preferences. One concludes that presentation with the better of the two testing results is also cognitively preferred to the other. This gives rise to one instance of learner preference data.

Finally, there is yet another kind of preference data that is generated during a learner's interactions with the Learning System. These are revealed through the learner's own choices while interacting with the Learning System. Material or objects chosen rather than other available options are all indicators of a learner's cognitive profile and choosing one is recorded as reflecting a preference for that one. This latter type of preference data is presumably not as reliable as an indication of a learner's cognitive functioning as is determinable through the testing procedures discussed above.

Thus, it can be seen that tracking the responses of a learner who is using the Learning System is the primary way in which the system creates and continually updates a cognitive profile of each learner. This behavior includes performance under testing and even decisions or choices made by the learner. Based on these results a cognitive profile is created and continuously updated by the system. This provides unprocessed information on learner preferences regarding both content and format.

Preferences are normally formulated between two objects of the same kind. In the case of the Learning System technology these objects are cognitive indices. Each index has been associated with one or more Learning System events that exhibit a certain topical focus and media orientation (or style of presentation). The cognitive indices consist of numerical data indicating the weight or level of each of the features of a presentation. This simplifies the description of the processes in engine 26 that act on indices. Cognitive indices typically have a fixed number of components, say d-many (for example, for an index consisting of a code for the topic of the content and a code for the video, audio, and text weights, four components would be used). Thus, the cognitive preferences to be tracked will be instances of an ordering relation between d-tuples.

The ordering of preference relations permits a determination of which of the available cognitive indices is most preferred by a learner. As will be discussed further below, this ordering of the preference relations can be used as an approximation of the utility function for a learner and this approximation can be used in an error correction routine to update the learner's cognitive profile.

Analytical Form for Cognitive Utility

This section describes the methods used by the Learning System for condensing preference data into the learner's cognitive profiles and for using these profiles to choose the version of a presentation whose cognitive index is optimal with respect to the learner's cognitive preferences.

The first two steps are to determine what information is to be included in a profile and how the information is to be represented. By coding abstract properties of states, the features or properties of a presentation state can be described by a sequence of numerical components. Having fixed the order in which the components are listed, it is reasonable to assume further that an index s can be represented as a vector, F(s), in d-dimensional real space (in fact the possible descriptions can be restricted to a discrete finite space rather than that of the real numbers). Thus, s is a textual description of the cognitive index of Learning System material and F(s) is the corresponding vector of numerical data coding that textual description. If there are a total of d-many features (including content topic and possibly others), then F(s) is a d-dimensional vector (listing d-many different numerical codes for these features or aspects of a state).

To determine the utility of a particular cognitive index (and, thus, a particular event) for a particular learner, a cognitive utility function U(s) is used. The cognitive utility function is a mathematical function that operates on an event's cognitive index F(s) to provide a numeric indication of the expected effectiveness of the event for the particular learner.

For the sake of this detailed account of the preferred embodiment, it will be assumed that function U(s) has the form of a linear function of the vector F(s):

$$U(s) = W^T F(s), \tag{1}$$

where W is a column vector of weights and WT denotes the transpose of W. The right hand side of the equation (1) is the scalar product of the two vectors W and F(s).

Ultimately, function F is used to take an event e as input and return as its value the feature representation of the event:

$$F: E \rightarrow R^d \tag{2}$$

which is a mapping of events into indices, such that F(e) is the cognitive index associated with event e.

This discussion assumes that the cognitive utility of an event e is linearly representable, meaning that there are numbers a1, ..., ad such that:

$$U(e)=a1(F(e))1+\ldots+ad(F(e))d. \quad (3)$$

If W denotes the column vector with components a1, ..., ad then the displayed expression can be written in the form given above, namely:

$$U(e)=WTF(e), \quad (4)$$

such that U(e) is the vector scalar product of W and F(e). Thus, the problem of determining a cognitive utility function (for states having d-many feature indices) reduces to the problem of determining its coefficients a1, ..., ad of vector W.

As used in the Learning System, the vector W is a quantitative representation of the cognitive profile of the learner. It will therefore vary from one learner to another. The coefficients of W can be initialized and, using the cognitive utility approximation discussed below, can be updated (adapted) to more closely match the actual cognitive preferences of the learner.

Preference Tree Approximation of Cognitive Utility

Adaptation of coefficients of the cognitive profile W can be accomplished using an error correction routine which updates the coefficients based on the difference between the utility function and an approximation of the utility function. This approximation of U(s) will be denoted by U(s). This approximation is based on the cognitive preference data (preference relations) collected by the Learning System through testing and other means, as described above. The basic principle used in formulating an approximation for the value of U(s) is:

Cognitive utility is increasing with respect to the cognitive preference relation.

This principle forms the basis of an algorithm for computing U(s) based on preference data. Each instance of cognitive preferences input to inference and condensation engine 26 results from compared test results using the methods of parallel or sequential testing. As discussed above, preferences are represented as pairs of cognitive indices, i.e., elements of a binary relation PL(s,t). This is shorthand for the statement that the index s is cognitively preferred to the index t.

There is a close relationship between the preference relations of a learner and the cognitive utility function for that learner. Since a cognitive utility function's numerical values themselves are of little importance (and only the relative value of different package profiles), given one utility function for a learner another can easily be constructed (e.g. simply add one to each of its values). This is due to the fact that it is only the relative ordering induced by those values which is of concern. This suggests a way of passing from a preference ordering to a utility function and vice versa.

In particular, given a preference ordering P(s,t), it satisfies certain essential conditions:

1. P's field is finite;
2. P is anti-symmetric, i.e., P(s,t) implies that it is not the case that P(t,s).

It may also be assumed that P is transitive, sometimes called an assumption of rationality. Properties (1) and (2) imply that there are no loops in the preference ordering and that every sequence of profiles descending in order of preference terminates in a minimally preferred package profile.

The full tree of profiles, ordered in terms of cognitive preference relation P, can be denoted by TP. The minimal elements in this ordering are sometimes referred to as a leaves of TP. The two conditions on P are sufficient to allow a definition of a cognitive utility function based on P, denoted by U, by induction on the preference ordering:

Stage 1: if e is a leaf then set U(e)=0;
Stage 2: if e is not a leaf, then let:
   U(e)=(max{U(z): all z such that P(e,z)})+1.

If TP(e) denotes the subtree of TP consisting of all sequences below e, then:

U(e)=|TP(e)|=the height of TP(e).

The procedure for defining a preference ordering from a utility function is even simpler. Given two profiles s and t, it will be true that PU(s,t) if U(s)>U(t). The two conditions above hold and one can show that these two transformations are inverses of one another in a category theoretic sense.

This result can then be compared with the value predicted or computed by the current version of the cognitive utility function U(s). As the Learning System's knowledge of the cognitive preferences of a user grows with each successive observation of learner preference data, it will revise the definition of the cognitive utility function by revising the values of its coefficients (the coefficients of W). As will now be discussed, that revision is based on the error between the cognitive utility function U(s) and the approximation U(s).

Error Correction and Coefficient Updating

As remarked earlier, the cognitive utility function is completely determined by the learner's cognitive profile W and, in particular, by the coefficients occurring in W. To update these coefficients, the inference and condensation engine 26 systematically modifies the components of W each time it notices a discrepancy between U(s) and U(s), based on current preference data. The action taken can be expressed in terms of an error correction rule.

Given an index s, the first step is to compute the error term at s:

$$E(s)=U(s)-U(s).$$

Then, if wi denotes the ith coordinate of W, the update equation is:

$$wi'=wi+(U(s)-U(s))xi$$

where xi is the numerical index of the ith feature of the index s and is the updating constant. The updating constant can as usual be taken to be 0.01. Its purpose is to modulate the error correction so as not to have too large a variation from iteration to iteration. In calculating the error term shown above, it is assumed that the cognitive utility function U(s) is normal (a utility function is normal when it maps subjectively onto its range space; i.e., a cognitive utility function is normal if, seen as a ranking of profiles using natural numbers, every natural number less than the largest one taken as a value of U is also a value of U). This says that U is minimal among all the cognitive utility functions that rank profiles the same way as U. The consequence of the normality of U for calculating the error term above is that a non-zero error term will lead to legitimate correction in the updating process.

Finally, the cognitive utility function is updated based on s by letting the new version of W be:

(w1', ..., wd').

An Example of Content

As an example of how the Learning System functions, the following is a brief discussion of a portion of an eventstream. The nodes described here and shown in FIG. 4 all belong to (are indexed by) topics having to do with the development of astronomy and the mathematics of celestial motion. In some cases it helps to differentiate between active and passive links. The former are captured by the stricture of eventstreams while the latter are hypertext based.

The node at which the learner enters this eventstream is an event corresponding to the convening of the Council of Trent. It was organized by the Catholic Church in order to take action in response to the need for reform in the church. Next, there is a link to background on Luther and the event of his demands for reformation of the church. This event may have still or video images displaying the city of Trento and the site of the Council's meetings. The audio portion will be describing the visual images and may include the reading of church documents associated with the calling of the meeting. Student onscreen experiments here would allow the student to derive parts of the theory as well as individual formulae, depending upon student ability. Texts of decrees, in addition to the text of Luther's demands, may be displayed on screen accompanied by a visual image of Luther himself and other central actors in this event. All of this material might also be presented in story form with actors simulating dialog and interactions during the event process. At a separate point there could be a philosophico-historical discussion between officials or a third party.

Continuing in the example, there might next be a link to visual material on Trento and the site of the Council of Trent. This may include video or stills of graphics as well as an audio description of the scenes depicted. Texts of official Council and political decrees surrounding this event could also be provided. Also included could be the actual papal resolutions on changes in church practices as well as the creation of new church orders like the Paulists and others. These documents may be displayed on screen as they appeared originally and may be read by the moderator.

The next link is to an event describing Henry VIII of England's break with Rome in 1531. This event will be part of a separate eventstream depicting church history and development exclusively. Next, there is a link to an event describing Pope Sixtus IV's request that Regiomontanus study the problem of calendar reform. This event will include visual, textual and audio depicting the practical consequences of the defective calendar as well as the various forms of the calendar in use.

The next link is to background material describing the discrepancy between the lunar and solar months. This discussion would include the methods used to make observations and the tools available for making astronomical observation/measurement. Largely visual, this content will show both relics as well as describe the relevant theories of celestial motion. Audio commentary is included while text may be included that describes in words the material. Additionally, the presentation could include a complete discussion of the mathematics of calendar making, either as an optional or passive link. A separate mathematical discussion coupled to each of the competing astronomical theories would reveal the stricture of mathematical evolution.

Next, there is a link to background on Aristotle and Ptolemy, the corresponding cosmological system and its roots in the history of their ideas. There is also links to events surrounding the effects and observation of anomalies associated with the Aristotelian/Ptolomeic view of planetary motion with further links to other events in pre-Copernican astronomy.

Finally, in the depicted portion of the eventstream, there is a link to events surrounding the Pope's secretary's request that the mathematician Copernicus give a reliable algorithm for constructing the calendar in 1514. These events will include background on the mathematical tools and theory available for describing planetary motion. The format here is again variable and versions which are heavily textual, audio or visual are available.

To provide proper historical context, the eventstream includes two structurally similar topics in the form of competing cosmological systems, those of Aristotle/Ptolemy and that later of Copernicus. Each has to give a theory accounting for more or less the same set of objects (stars, planets, etc.) and the relationships between them (one orbiting around another and others). This also allows for the cognitive styles of the presentations to be varied as desired. In particular it accommodates the testing procedures described in the previous section on the inference and condensation engine aimed at recording cognitive preferences.

It will thus be apparent that there has been provided in accordance with the present invention an interactive instructional system which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

We claim:

1. A method of computerer-based learning, comprising the steps of:

providing a plurality of related event objects, each of which includes different content that is topically related to the content of the other of said event objects, and each of which has one or more attributes including at least an audio, textual, or visual component that can be presented via a computer workstation;

providing a number of additional event objects, each of which includes content that is substantially the same as the content of a corresponding one of the related event objects, and each of which provides a presentation of content that is different than the presentation provided by the corresponding related event object;

wherein each of said event objects has an associated cognitive index that includes data representing the attributes utilized in the presentation provided by the event object;

generating a cognitive profile for a learner using a plurality of parameters, at least some of which are each associated with one or more of the attributes and are each indicative of a cognitive utility of its associated attributes(s) for the learner;

creating an eventsream having the structure of a branching sequence of nodes, each of the nodes representing one of the related event objects and any of the additional event objects corresponding to that related event object; and presenting a number of the event objects to the learner starting with an event object located at a first one of the nodes, and, for any node having two or more event objects, selecting at least one of the event objects for presentation to the learner from among all of the event objects at the node using the learner's cognitive profile and the event objects' cognitive indices.

2. The method of claim 1, wherein said step of creating the eventstream comprises creating a script that identifies the event objects within the eventstream and that defines the branching sequence of event objects.

3. The method of claim 1, wherein different event objects having substantially the same content have differing emphases on the audio, textual, and visual components used in their presentations.

4. The method of claim 1, wherein the data used in the cognitive index of each event object comprises quantitative data that provides a weighted measure of the attributes of the event object and wherein at least some of the parameters of the cognitive profile that are associated with one or more of the attributes comprise numeric values indicative of the degree of cognitive utility of its associated attribute(s) for learner.

5. A method of computer-based learning, comprising the steps of:

providing a plurality of computer-based presentations, wherein some presentations provide different topically-related educational content and other presentations utilize different cognitive styles to present substantially similar content, and wherein the other presentations that utilize different cognitive styles each has a cognitive index associated therewith that includes quantitative data representative of attributes utilized in the presentation with the quantitative data each indicating the extent to which its associated attribute is present in the presentation;

providing a cognitive profile for a learner, with the cognitive profile comprising a set of parameters, each of which can be associated with at least one of the attributes and has a numeric value indicative of the cognitive utility of its associated attribute(s) for the learner;

selecting at least one of the other presentations using a mathematical function that, using the leaner's cognitive profile and at least some of the other presentations' cognitive indices, determines which of those other presentations best matches the cognitive style of the learner; and providing the learner with an ordered sequence of the presentations that includes the selected presentations.

6. The method of claim 5, further comprising the steps of:

providing a utility function that utilizes the learner's cognitive profile and that provides a measure of the teaching utility of each of the cognitive styles;

testing the learner to determine which of the cognitive styles results in the greatest comprehension by the learner of content contained within a presentation;

determining one or more preference relations between cognitive styles based upon the testing; and updating the utility function based upon the determined preference relations; and wherein said selecting step further comprises selecting presentations to be presented to the learner using the utility function and the cognitive index associated with the presentations.

7. The method of claim 6, wherein the utility function represents the mathematical function used in selecting presentations and wherein said step of selecting at least one of the other presentations further comprises selecting the one of those presentations whose cognitive index maximizes the utility function.

8. The method of claim 6, further comprising the step of iteratively repeating said testing, determining, updating, and selecting steps to thereby adapt the presentation of content and increase the comprehension of the learner.

9. The method of claim 5, wherein the step of providing a cognitive profile further comprises testing the learner using presentations having different cognitive styles and determining the cognitive profile using the cognitive index associated with the cognitive style that resulted in the greatest comprehension by the learner of the content presented during testing, and wherein the method further comprises the step of aggregating information about a large number of learners' cognitive profiles.

10. The method of claim 9, further comprising the step of developing new presentations having a cognitive style that is selected based upon the aggregate information.

11. A method of presenting information to a user on a computer workstation, comprising the steps of:

providing a plurality of computer-displayable presentations, some of which provide different topically-related content and others of which utilize different cognitive styles to present substantially similar content, and wherein the other presentations that utilize different cognitive styles each has a cognitive index associated therewith that includes quantitative data representative of attributes utilized in the presentation with the quantitative data each indicating the extent to which its associated attribute is present in the presentation;

providing a cognitive profile for the user, with the cognitive profile comprising a set of parameters, each of which can be associated with at least one of the attributes and has a numeric value indicative of the cognitive utility of its associated attribute(s) for the learner;

selecting at least one of the other presentations using a mathematical function that, using the user's cognitive profile and at least some of the other presentations' cognitive indices, determines which of those other presentations best matches the cognitive style of the user; and providing the user with an ordered sequence of the presentations that includes the selected presentations.

12. The method of claim 11, wherein said computer-displayable presentations comprise web pages and wherein said providing step further comprises providing the web pages over a global computer network for display on the computer workstation.

13. The method of claim 12, wherein said assigning step further comprises storing information on the user's computer workstation that identifies the cognitive profile associated with the user.

14. The method of claim 13, wherein said storing step further comprises storing a cookie on the user's computer workstation, with said cookie providing information that identifies the cognitive profile associated with the user.

15. A method of generating a cognitive profile for a learner for use in selecting among different presentations of educational content delivered by a computer-based learning system, wherein the different presentations each have quantitative data representing the extent to which different attributes are present in the presentation, the method comprising the steps of:

(a) providing an initial set of coefficients that together form at least a portion of the cognitive profile, wherein the coefficients comprise numeric values each of which is associated with at least one of the attributes;

(b) providing feedback through iterations of the following steps (b1)–(b3):

(b1) presenting educational content to the learner using different presentations having varying emphasis on different ones of the attributes;

(b2) determining which of the presentations given to the learner results in the greatest comprehension of the educational content presented; and (b3) updating the coefficients using the quantitative data associated with the presentation identified in step (b2).

16. The method of claim 15, further comprising the step of generating a utility function using the cognitive profile and wherein step (b3) further comprises updating the coefficients using both the utility function and an approximation of the utility function.

17. The method of claim 16, wherein step (b2) further comprises determining one or more preference relations and thereafter determining the approximation of the utility function using the preference relation(s).

18. The method of claim 15, wherein said numeric values comprise scaled settings of the cognitive profile and wherein step (a) further comprises providing at least one toggle setting that forms a portion of the cognitive profile, with said toggle setting representing at least one unweighted attribute of the learner's cognitive style.

19. The method of claim 15, wherein step (a) further comprises providing learner-identifying data that forms a portion of the cognitive profile.

20. The method of claim 15, wherein step (b) further comprises using the learning system to perform steps (b1)–(b3) on a continuous basis.

* * * * *

UNITED STATES PATENT AND TRADEMARK OFFICE
CERTIFICATE OF CORRECTION

PATENT NO. : 6,164,975
DATED : December 26, 2000
INVENTOR(S) : Marshall Weingarden and Edward Ronald Griffor It is certified that error appears in the above-identified patent and that said Letters Patent is hereby corrected as shown below:

Column 4,
Line 51, delete "Windows95TM or Windows98TM" and insert therefor -- Windows95™ or Windows98™ --.
Line 52, delete Windows NTTM and insert therefor -- Windows NT™ --.

Column 5,
Line 34, delete "T" and insert therefor -- $T$ --.
Line 35, delete "T" (both occurrences) and insert therefore -- $T$ --

Column 8,
Line 55, delete "PL(s,t)" and insert therefor -- $P_L(s,t)$ --.
Line 57, delete "PL(s,t)" and insert therefor -- $P_L(s,t)$ --.
Line 62, delete "(x1, . . . , xn;y1, . . . , ym)" and insert therefor $(x_1, ..., x_n; y_1, ..., y_m)$ --.

Column 10,
Line 57, delete "U(s)=WTF(s)," and insert therefor -- $U(s) = W^T F(s)$, --.
Line 59, WT" and insert therefor -- $W^T$ -- .
Line 65, delete "F: E->Rd" and insert therefor -- $F: E \rightarrow R^d$ --.

Column 11,
Line 5, delete "U(e)=al(F(e))l+. . . +ad(F(e))d" and insert therefor -- $U(e) = a_1(F(e))_1 + ... + a_d(F(e))_d$ --.
Line 6 and 7, delete "al,..., ad" and insert therefor -- $a_1, ..., a_d$ --.
Line 10, delete "U(e)=WTF(e)," and insert therefor -- $U(e) = W^T F(e)$, --.
Line 15, delete "al,..., ad" and insert therefor -- $a_1, ..., a_d$ --.
Line 30, delete "U(s)" (second occurrence) and insert therefor -- $\underline{U}(s)$ --.
Line 39, delete "U(s)" and insert therefor -- $\underline{U}(s)$ --.
Line 44, delete "PL(s,t)" and insert therefor -- $P_L(s,t)$ --.

Column 12,
Lines 2 and 4, delete "TP" and insert therefor -- $T_P$ --.
Line 6, delete "U" and insert therefor -- $\underline{U}$ --.
Line 7, delete "U(e)" and insert therefor -- $\underline{U}(e)$ --.
Line 9, delete "U(e) = (max{ U(z) : all z such that P(e,z) })+1" and insert therefore -- $\underline{U}(e) = (\max\{ \underline{U}(z) : \text{all } z \text{ such that } P(e,z) \})+1$ --.
Line 10, delete "TP(e)" and insert therefor -- $T_P(e)$ --.
Line 10, delete "TP" and insert therefor -- $T_P$ --.
Line 13, delete "U(e) = |TP(e)| = the height of TP(e)" and insert therefor -- $\underline{U}(e) = |T_P(e)|$ = the height of $T_P(e)$ --.

UNITED STATES PATENT AND TRADEMARK OFFICE
CERTIFICATE OF CORRECTION

PATENT NO. : 6,164,975
DATED : December 26, 2000
INVENTOR(S) : Marshall Weingarden and Edward Ronald Griffor It is certified that error appears in the above-identified patent and that said Letters Patent is hereby corrected as shown below:

<u>Column 12 cont'd,</u>
Line 16, delete "PU" and insert therefor -- $P_U$ --.
Line 27, delete "U(s)" (second occurrence) and insert therefor -- $\underline{U}(s)$ --.
Line 36, delete "U(s)" (first occurrence) and insert therefor -- $\underline{U}(s)$ --.
Line 43, delete "E(s) = U(s) – U(s)" and insert therefor -- $E(s) = U(s) - \underline{U}(s)$ --.
Line 44, delete "wi" and insert therefor -- $w_i$ --.
Line 44, delete "ith" and insert therefor -- $i^{th}$ --.
Line 47, delete "wi' =wi+(U(s)-U(s))xi" and insert therefor -- $w_i' = w_i + \eta(U(s)-\underline{U}(s))x_i$ --.
Line 49, delete "xi" and insert therefor -- $x_i$ --.
Line 50, delete "and is" and insert therefor -- and $\eta$ is --.
Line 67, delete "(w1',...,wd')" and insert therefor -- $(W_1',...,W_d')$ --.

Signed and Sealed this

Twenty-second Day of January, 2002

*Attest:*

*Attesting Officer*

JAMES E. ROGAN
*Director of the United States Patent and Trademark Office*